US012354305B1

(12) United States Patent
Hu et al.

(10) Patent No.: US 12,354,305 B1
(45) Date of Patent: Jul. 8, 2025

(54) CAMERA MISALIGNMENT DETECTION SYSTEM FOR A VEHICLE (71) Applicant: GM Global Technology Operations LLC, Detroit, MI (US)

(72) Inventors: Yao Hu, Sterling Heights, MI (US); Binbin Li, Columbus, OH (US); Xinyu Du, Oakland Township, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/644,522

(22) Filed: Apr. 24, 2024

(51) Int. Cl.
*G06T 7/246* (2017.01)
*G06T 7/73* (2017.01)
*H04N 17/00* (2006.01)

(52) U.S. Cl.
CPC ............... *G06T 7/74* (2017.01); *G06T 7/248* (2017.01); *H04N 17/002* (2013.01); *G06T 2207/20076* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 2011/0157373 A1 | 6/2011 | Ye et al. | |
| 2014/0226864 A1* | 8/2014 | Venkatraman | G01C 21/20 382/107 |
| 2020/0005489 A1 | 1/2020 | Kroeger | |
| 2022/0066456 A1* | 3/2022 | Ebrahimi Afrouzi | G06F 3/04883 |
| 2023/0215045 A1 | 7/2023 | Hu et al. | |
| 2023/0256975 A1 | 8/2023 | Li et al. | |
| 2023/0260157 A1 | 8/2023 | Li et al. | |
| 2023/0260291 A1 | 8/2023 | Li et al. | |

FOREIGN PATENT DOCUMENTS

| | | | | |
|---|---|---|---|---|
| CN | 115272456 A | | 11/2022 | |
| EP | 2801054 B1 | * | 6/2017 | ........... G06K 9/6211 |

* cited by examiner

*Primary Examiner* — Tyler W. Sullivan
(74) *Attorney, Agent, or Firm* — Vivacqua Crane, PLLC (57) ABSTRACT

A camera misalignment detection system detecting a misalignment condition of one or more cameras for a vehicle includes one or more controllers that determine a set of matched pixel pairs, determine a feature matching ratio based on the set of matched pixel pairs, and calculate an alignment angle difference of the one or more cameras. In response to determining the feature matching ratio, the essential matrix inlier ratio, and the alignment angle difference each exceed respective threshold values, the controllers add the alignment angle difference to a queue including a sequence of historical alignment angle difference values. The controllers perform statistical filtering to determine a total number of historical alignment angle difference values within the queue that are inliers and determine a misalignment condition of the one or more cameras based on the total number of historical alignment angle difference values within the queue that are inliers.

20 Claims, 4 Drawing Sheets

CAMERA MISALIGNMENT DETECTION SYSTEM FOR A VEHICLE

The present disclosure relates to a camera misalignment detection system that detects a misalignment condition of one or more cameras for a vehicle.

A vehicle may utilize various types of perception sensors for gathering perception data regarding the surrounding environment. One specific type of perception sensor that is commonly employed is a camera, which collects image data regarding the environment surrounding the vehicle. The image data collected by the camera may be used in a variety of vehicular systems such as, but not limited to, an automated driving system (ADS), an advanced driver assistance system (ADAS), and automatic parking assist. However, when the camera is misaligned, this may create issues with the vehicular systems that rely upon the image data collected by the camera.

There are several camera misalignment detection algorithms that are presently available to detect camera misalignment, however, some of these existing camera misalignment detection algorithms may have drawbacks. For example, one existing camera misalignment detection algorithm that employs only motion vectors may trigger false positive events when subjected to limited visibility conditions such as nighttime driving and inclement weather like rain or snow.

Thus, while current camera misalignment algorithms achieve their intended purpose, there is a need in the art for an improved approach for detecting camera misalignment that is robust when subjected to limited visibility conditions.

SUMMARY

According to several aspects, a camera misalignment detection system for detecting a misalignment condition of one or more cameras for a vehicle is disclosed. The camera misalignment detection system includes one or more controllers in electronic communication with the one or more cameras to receive two image frames from the one or more cameras. The one or more controllers including one or more processors that execute instructions to determine a set of matched pixel pairs between the two image frames, where each matched pixel pair of the set of matched pixel pairs indicates movement of a specific pixel between the two image frames. The one or more controllers determine a feature matching ratio based on the set of matched pixel pairs, where the feature matching ratio represents a number of matched pixel pairs between the two image frames that are predicted within a threshold distance value and are classified as inliers versus a total number of matched pixel pairs between the two image frames. The one or more controllers calculate an alignment angle difference of the one or more cameras based on an essential matrix of the one or more cameras and the set of matched pixel pairs between the two image frames. The one or more controllers compare the feature matching ratio, an essential matrix inlier ratio, and the alignment angle difference with respective threshold values. In response to determining the feature matching ratio, the essential matrix inlier ratio, and the alignment angle difference each exceed the respective threshold values, the one or more controllers determine a potential misalignment condition of the one or more cameras exists and add the alignment angle difference to a queue including a sequence of historical alignment angle difference values. The one or more controllers perform statistical filtering to determine a total number of historical alignment angle difference values within the queue that are inliers. The one or more controllers determine the misalignment condition of the one or more cameras based on the total number of historical alignment angle difference values within the queue that are inliers.

In another aspect, in response to determining the misalignment condition of the one or more cameras, the one or more controllers transmit a disablement signal to one or more systems within the vehicle that rely upon image data collected by the one or more cameras.

In yet another aspect, the alignment angle difference represents a difference in motion of the one or more cameras between an image frame captured at a current timestamp and historical motion of the one or more cameras.

In an aspect, the one or more processors of the one or more controllers execute instructions to evaluate historical results of pose recovery between two camera coordinate systems that each correspond to one of the two image frames over a period of time to determine a convergence condition, where the historical motion of the one or more cameras is represented by the historical results of the pose recovery between the two camera coordinate systems, and where determining the potential misalignment condition of the one or more cameras is further based on the convergence condition.

In another aspect, the convergence condition is determined by confirming the historical results of the pose recovery between the two camera coordinate systems that each correspond to one of the two image frames include a threshold sample size of image frames.

In yet another aspect, the statistical filtering to determine the total number of historical alignment angle difference values within the queue that are inliers includes evaluating all of the historical alignment angle difference values within the queue to identify an ideal bandwidth based on a bandwidth-based loss function.

In an aspect, the bandwidth-based loss function is expressed as:

$$b^* = \underset{b}{\operatorname{argmax}} \sum_j \sum_i \exp\left(-\frac{(\Delta\varphi_j - \Delta\varphi_i)^2}{2b^2}\right)$$

where b* represents the ideal bandwidth, b represents a bandwidth corresponding to each of the historical alignment angle difference values within the queue, $\Delta\varphi$ represents a historical alignment angle difference value, i represents an index of one of the historical alignment angle difference values in the queue, and j represents the index of another historical alignment angle difference value other than a current historical alignment angle difference $\Delta\varphi_i$.

In another aspect, the statistical filtering to determine the total number of historical alignment angle difference values within the queue that are inliers includes evaluating all of the historical alignment angle difference values within the queue to identify a prime alignment angle difference value based on an angle-based loss function, where the prime alignment angle difference value indicates the highest kernel density of all the historical alignment angle difference values within the queue.

In yet another aspect, the angle-based loss function is expressed as:

$$\Delta\varphi^* = \underset{\Delta\varphi}{\operatorname{argmax}} \sum_i \exp\left(-\frac{(\Delta\varphi - \Delta\varphi_i)^2}{2b^{*2}}\right)$$

where $\Delta\varphi^*$ represents the prime alignment angle difference value, $b^*$ represents the ideal bandwidth, $\Delta\varphi$ represents a historical alignment angle difference value, and i represents an index of one of the historical alignment angle difference values in the queue.

In an aspect, the feature matching ratio is determined by predicting a position of the specific pixel for each matched pixel pair that is part of the set of matched pixel pairs in a subsequent image frame based on the movement of the specific pixel as indicated by the matched pixel pair between the two image frames, motion of the vehicle, camera-to-vehicle alignment parameters, and a position of a feature that the specific pixel represents in three-dimensional space in the real world.

In another aspect, the position of the specific pixel in a subsequent image frame is represented by a two-dimensional probabilistic distribution.

In yet another aspect, the feature matching ratio is determined by determining a distance between the two-dimensional probabilistic distribution representing the position of the specific pixel in the subsequent image frame with an actual position of the specific pixel as indicated by the subsequent image frame for each matched pixel pair that is part of the set of matched pixel pairs and determining the feature matching ratio by comparing the distance between the two-dimensional probabilistic distribution and the actual position of the specific pixel for each matched pixel pair that is part of the set of matched pixel pairs with a threshold distance value.

In an aspect, the distance between the two-dimensional probabilistic distribution and the actual position of the specific pixel as indicated by the subsequent image frame is represented by the Mahalanobis distance.

In another aspect, the two-dimensional probabilistic distribution is a two-dimensional Gaussian distribution.

In yet another aspect, a method for detecting a misalignment condition of one or more cameras that are part of a vehicle is disclosed. The method includes determining, by one or more controllers in electronic communication with the one or more cameras, a set of matched pixel pairs between two image frames received by the one or more cameras, wherein each matched pixel pair of the set of matched pixel pairs indicates movement of a specific pixel between the two image frames. The method includes determining, by the one or more controllers, a feature matching ratio based on the set of matched pixel pairs, where the feature matching ratio represents a number of matched pixel pairs between the two image frames that are predicted within a threshold distance value and are classified as inliers versus a total number of matched pixel pairs between the two image frames. The method includes calculating, by the one or more controllers, an alignment angle difference of the one or more cameras based on an essential matrix of the one or more cameras and the set of matched pixel pairs between the two image frames. The method includes comparing, by the one or more controllers, the feature matching ratio, an essential matrix inlier ratio, and the alignment angle difference with respective threshold values. In response to determining the feature matching ratio, the essential matrix inlier ratio, and the alignment angle difference each exceed the respective threshold values, the method includes determining a potential misalignment condition of the one or more cameras exists and adding the alignment angle difference to a queue including a sequence of historical alignment angle difference values. The method includes performing, by the one or more controllers, statistical filtering to determine a total number of historical alignment angle difference values within the queue that are inliers. Finally, the method includes determining, by the one or more controllers, a misalignment condition of the one or more cameras based on the total number of historical alignment angle difference values within the queue that are inliers.

In another aspect, in response to determining the misalignment condition of the one or more cameras, the method includes transmitting, by the one or more controllers, a disablement signal to one or more systems within the vehicle that rely upon image data collected by the one or more cameras.

In yet another aspect, a camera misalignment detection system for detecting a misalignment condition of one or more cameras for a vehicle is disclosed. The camera misalignment detection system includes one or more controllers in electronic communication with the one or more cameras to receive two image frames from the one or more cameras. The one or more controllers including one or more processors that execute instructions to determine a set of matched pixel pairs between the two image frames, where each matched pixel pair of the set of matched pixel pairs indicates movement of a specific pixel between the two image frames. The one or more controllers determine a feature matching ratio based on the set of matched pixel pairs, where the feature matching ratio represents a number of matched pixel pairs between the two image frames that are predicted within a threshold distance value and are classified as inliers versus a total number of matched pixel pairs between the two image frames. The one or more controllers calculate an alignment angle difference of the one or more cameras based on an essential matrix of the one or more cameras and the set of matched pixel pairs between the two image frames, where the alignment angle difference represents a difference in motion of the one or more cameras between an image frame captured at a current timestamp and historical motion of the one or more cameras. The one or more controllers evaluate historical results of pose recovery between two camera coordinate systems that each correspond to one of the two image frames over a period of time to determine a convergence condition, where the historical motion of the one or more cameras is represented by the historical results of the pose recovery between the two camera coordinate systems that each correspond to one of the two image frames. The one or more controllers compare the feature matching ratio, an essential matrix inlier ratio, and the alignment angle difference with respective threshold values. In response to determining the feature matching ratio, the essential matrix inlier ratio, and the alignment angle difference each exceed the respective threshold values and that the convergence condition exists, the one or more controllers determine a potential misalignment condition of the one or more cameras exists and add the alignment angle difference to a queue including a sequence of historical alignment angle difference values. The one or more controllers perform statistical filtering to determine a total number of historical alignment angle difference values within the queue that are inliers. The one or more controllers determine a misalignment condition of the one or more cameras based on the total number of historical alignment angle difference values within the queue that are inliers. In response to determining the misalignment condition of the one or more cameras, the one or more controllers transmit a disablement signal to one or more systems within the vehicle that rely upon image data collected by the one or more cameras.

In another aspect, the statistical filtering to determine the total number of historical alignment angle difference values within the queue that are inliers includes evaluating all of the historical alignment angle difference values within the queue to identify an ideal bandwidth based on a bandwidth-based loss function.

In yet another aspect, the statistical filtering to determine the total number of historical alignment angle difference values within the queue that are inliers includes evaluating all of the historical alignment angle difference values within the queue to identify a prime alignment angle difference value based on an angle-based loss function, where the prime alignment angle difference value indicates the highest kernel density of all the historical alignment angle difference values within the queue.

In another aspect, the feature matching ratio is determined by predicting a position of the specific pixel for each matched pixel pair that is part of the set of matched pixel pairs in a subsequent image frame based on the movement of the specific pixel as indicated by the matched pixel pair between the two image frames, motion of the vehicle, camera-to-vehicle alignment parameters, and a position of a feature that the specific pixel represents in three-dimensional space in the real world.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
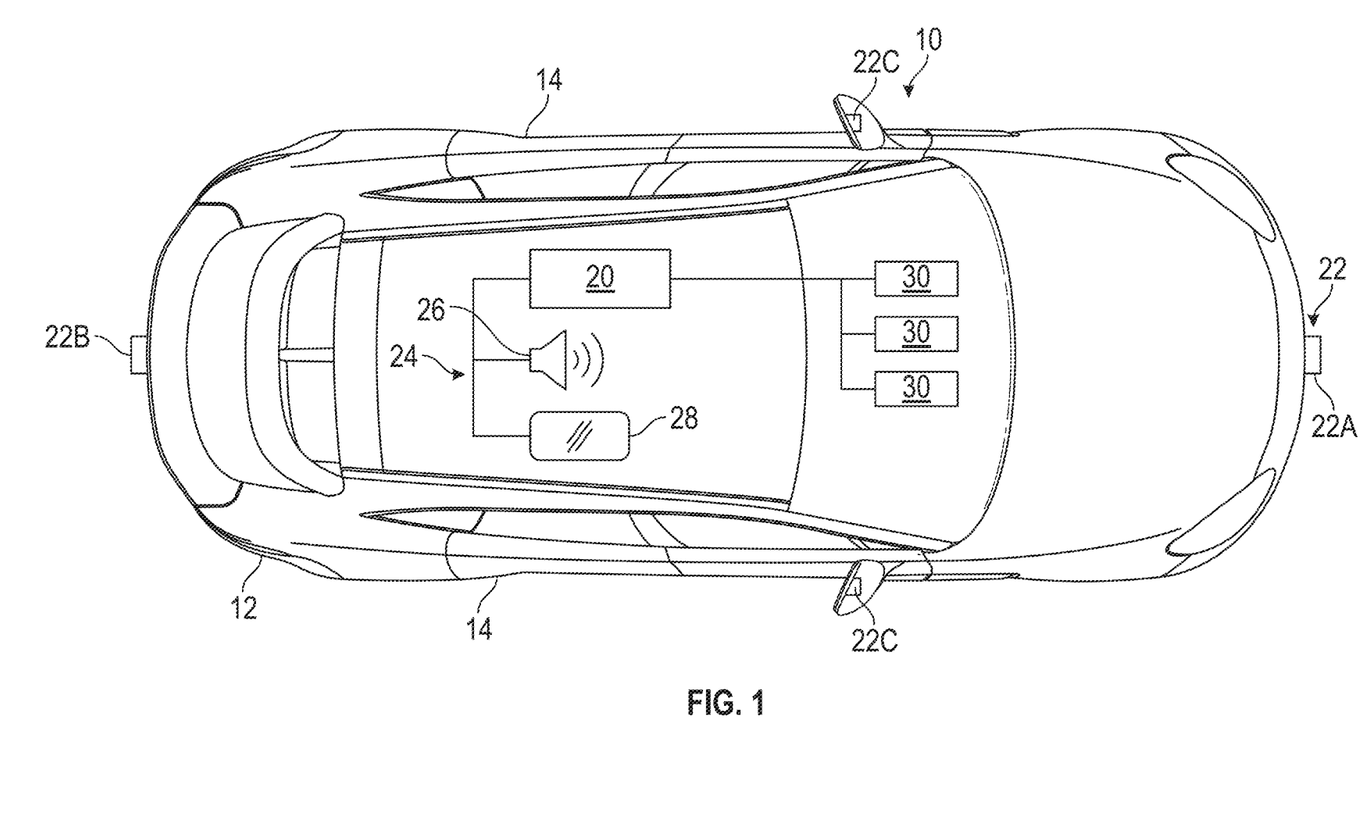
FIG. 1 is a schematic diagram of the disclosed system camera misalignment detection system for a vehicle including one or more controllers in electronic communication with one or more cameras, according to an exemplary embodiment.

Referring to FIG. 1, an exemplary camera misalignment detection system 10 for a vehicle 12 is illustrated. The camera misalignment detection system 10 includes one or more controllers 20 in electronic communication with one or more cameras 22 and one or more notification devices 24. The one or more cameras 22 are exterior-facing cameras that capture image data representative of an environment surrounding the vehicle 12. In the non-limiting embodiment as shown in FIG. 1, the one or more cameras 22 include a forwardly facing camera 22A, a rearwardly facing camera 22B, and two sideways facing cameras 22C positioned at respective sides 14 of the vehicle 12, however, it is to be appreciated that fewer or additional cameras may be included as part of the vehicle 12 as well. Furthermore, although FIG. 1 illustrates the vehicle 12 as a sedan, the vehicle 12 may be any other type of automobile such as a truck, sport utility vehicle, van, or motor home. Moreover, the vehicle 12 is not limited to an automobile and may be any type of rigid body that propels itself such as, for example, unmanned aerial vehicle (UAV), an airplane, or a marine vehicle such as a boat.

As explained below, the camera misalignment detection system 10 detects a misalignment condition of at least one of the one or more cameras 22 that are part of the vehicle 12. In response to detecting the misalignment of at least one camera 22, the one or more controllers 20 instructs the one or more notification devices 24 to inform a user of the vehicle 12 of a misalignment condition with the one or more cameras 22. In the non-limiting embodiment as shown in FIG. 1, the notification devices include a speaker 26 that generates an audio notification and a display 28 that generates a visual notification. However, it is to be appreciated that other types of notification devices such as haptic devices may be used as well. The notification may instruct the user to visit an authorized dealer or other service center to check the misalignment condition of the one or more cameras 22.

The one or more controllers 20 also transmits a disablement signal to one or more controllers 30 that are part of one or more systems within the vehicle 12 that rely upon image data collected by the one or more cameras 22 in response to detecting the misalignment condition, where the disablement signal either disables or limits specific features. Some examples of systems that rely upon the image data collected by the one or more cameras 22 include, but are not limited to, an automated driving system (ADS), an advanced driver assistance system (ADAS), and automatic parking assist.

Figure 2:
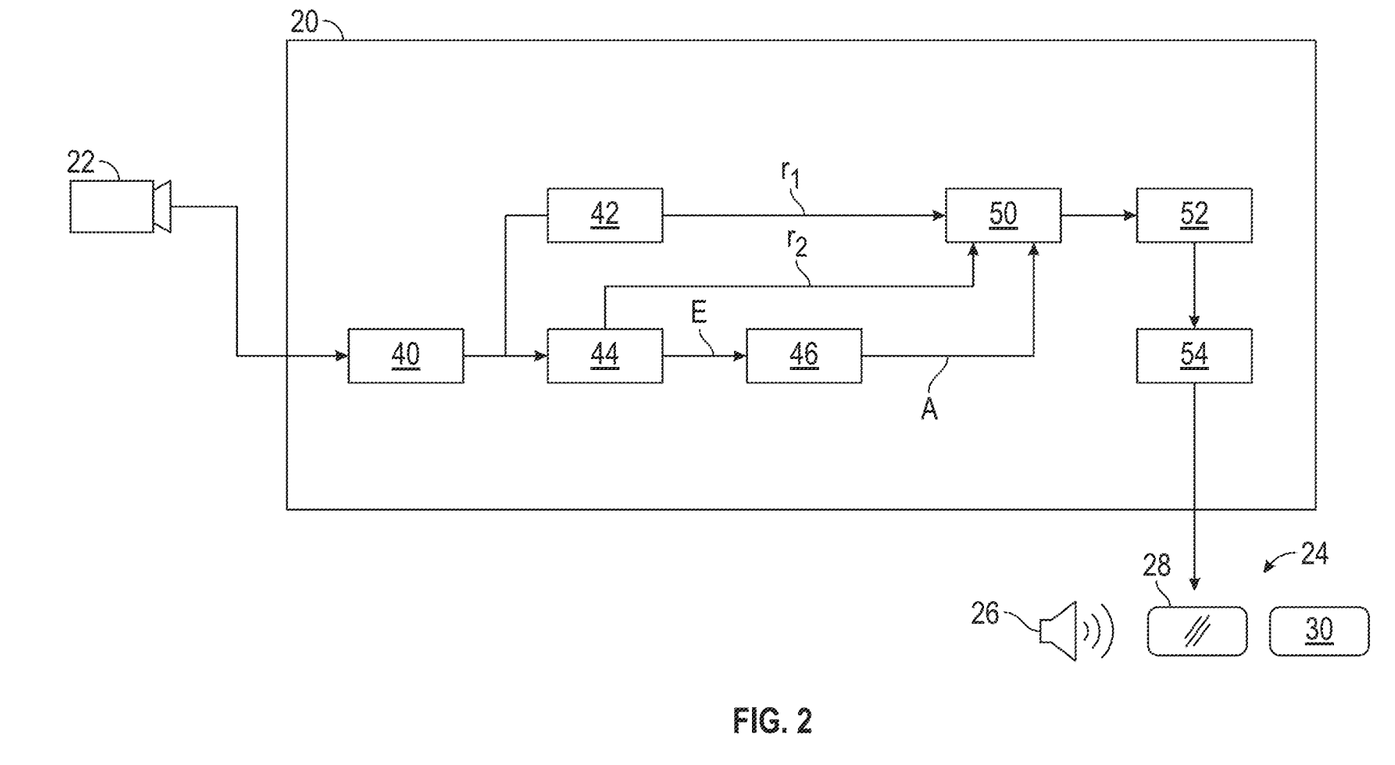
FIG. 2 is a block diagram illustrating the software architecture for the one or more controllers shown in FIG. 1, according to an exemplary embodiment.

FIG. 2 is a block diagram illustrating the software architecture for the one or more controllers 20. The one or more controllers 20 include a feature prediction and matching module 40, a feature matching evaluation module 42, an essential matrix module 44, a pose recovery module 46, a vision filtering module 50, a statistic filtering module 52, and a decision module 54.

The feature prediction and matching module 40 of the one or more controllers 20 receives two image frames from the one or more cameras 22 of the vehicle 12, where the two image frames each include a unique timestamp and capture common features in the environment surrounding the vehicle 12. There is no requirement that the two image frames are consecutive, however, the two image frames both include the same objects located in the environment surrounding the vehicle 12.

The feature prediction and matching module 40 of the one or more controllers 20 performs feature matching to determine a set of matched pixel pairs between the two image frames, where each matched pixel pair that is part of the set of matched pixel pairs indicates movement of a specific pixel between the two image frames. The specific pixel represents a point position of a feature located in the environment surrounding the vehicle 12. The feature may be, for example, an identified point on an object located in the environment such as pavement of the road, another vehicle, or vegetation such as trees or bushes. Each matched pixel pair represents the two positions of the specific pixel as the pixel moves between the two image frames, and the set of matched pixel pairs represents all of the matched features that are included within the two image frames.

The feature matching evaluation module 42 receives the set of matched pixel pairs between the two image frames from the feature prediction and matching module 40 of the one or more controllers 20 and determines a feature matching ratio $r_1$ based on the set of matched pixel pairs. The feature matching evaluation module 42 of the one or more controllers 20 determines the feature matching ratio $r_1$ by first predicting a position of the specific pixel for each matched pixel pair that is part of the set of matched pixel pairs in a subsequent image frame based on the movement of the specific pixel as indicated by the matched pixel pair between the two image frames, motion of the vehicle 12, camera-to-vehicle alignment parameters, and a position of a feature that the specific pixel represents in three-dimensional space in the real world. The position of the specific pixel in a subsequent image frame is represented by a two-dimensional probabilistic distribution 70, which is shown in FIG. 3.

Figure 3:
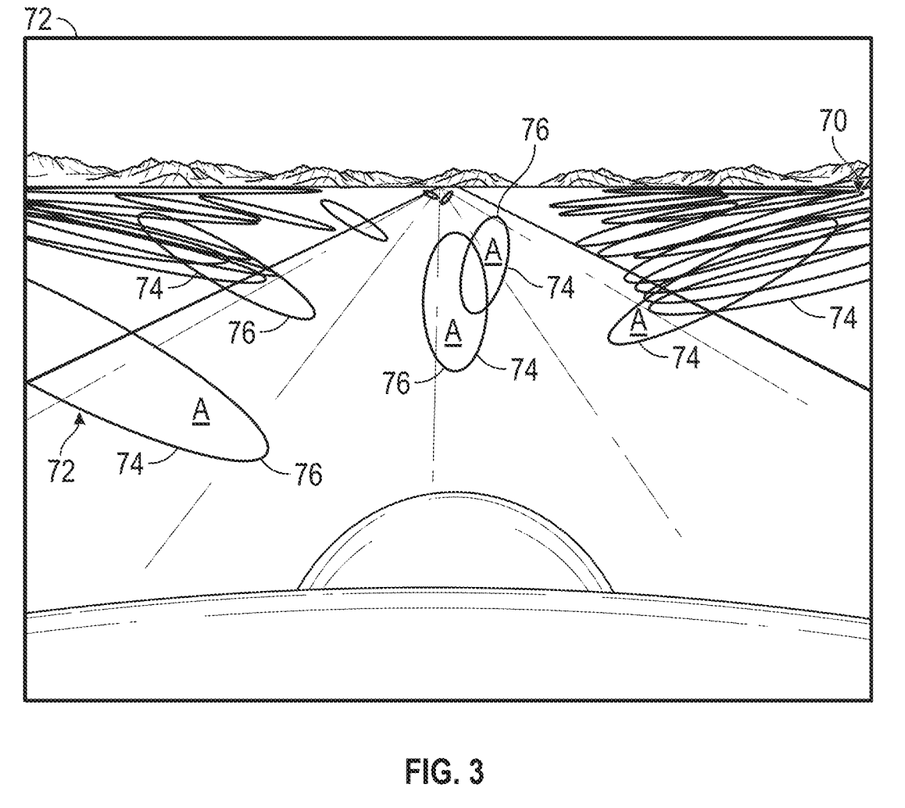
FIG. 3 is an illustration of an exemplary subsequent image frame captured by the one or more cameras including several exemplary two-dimensional probabilistic distributions, according to an exemplary embodiment.

FIG. 3 is an illustration of an exemplary subsequent image frame 72 captured by the one or more cameras 22 of the vehicle 12 (FIG. 1) including several exemplary two-dimensional probabilistic distributions 70. In the exemplary embodiment as shown in FIG. 3, each two-dimensional probabilistic distribution 70 is a two-dimensional Gaussian distribution including a probability threshold that is represented by an ellipse 74. The ellipse 74 includes a boundary 76, where an area A enclosed by the boundary 76 of the ellipse 74 represents a region where the position of the specific pixel is located with the probability threshold. Although FIG. 3 illustrates each two-dimensional probabilistic distribution 70 as a Gaussian distribution, it is to be appreciated that other types of statistical distributions may be used as well.

Referring to FIGS. 2 and 3, the feature matching evaluation module 42 of the one or more controllers 20 determines a distance between the two-dimensional probabilistic distribution 70 representing the position of the specific pixel in the subsequent image frame and an actual position of the specific pixel as indicated by the subsequent image frame for each matched pixel pair that is part of the set of matched pixel pairs. The distance between the two-dimensional probabilistic distribution 70 and the actual position of the specific pixel as indicated by the subsequent image frame is represented by the Mahalanobis distance.

The feature matching evaluation module 42 of the one or more controllers 20 determines the feature matching ratio $r_1$ by comparing the distance between the two-dimensional probabilistic distribution 70 and the actual position of the specific pixel for each matched pixel pair that is part of the set of matched pixel pairs with a threshold distance value, and classifying a matched pixel pair as an inlier if the distance is less than the threshold distance value. The threshold distance value is determined based on a target accuracy of the one or more cameras 22 and may vary based on the specific application. In embodiments, the threshold distance value is determined based on empirical data collected during testing. The feature matching ratio $r_1$ represents the matched pixel pairs between the two image frames that are predicted within the threshold distance value and are classified as inliers versus the total number of matched pixel pairs between the two image frames, and is expressed in Equation 1 as:

$$r_1 = \frac{\|\{d_M < \theta_m\}\|}{\|\{d_M\}\|} \qquad \text{Equation 1}$$

where $d_M$ represents the distance between the two-dimensional probabilistic distribution 70 and the actual position of the specific pixel for each matched pixel pair that is part of the set of matched pixel pairs, $\|\{\ \}\|$ represent counting the total number of matched pixel pairs between the two image frames based on the distance $d_M$, and $\theta_m$ represents the threshold distance value.

Referring to FIG. 2, the essential matrix module 44 receives the set of matched pixel pairs between the two image frames from the feature prediction and matching module 40 of the one or more controllers 20 and determines an essential matrix E of the one or more cameras 22 based on the set of matched pixel pairs between the two image frames. The essential matrix E indicates movement of the one or more cameras 22 between the unique timestamps of the two image frames. In addition to the essential matrix E, the essential matrix module 44 of the one or more controllers 20 determines an essential matrix inlier ratio $r_2$ based on the set of matched pixel pairs between the two image frames. The essential matrix inlier ratio $r_2$ indicates the number of matched pixel pairs that satisfy an epipolar geometric condition. The epipolar geometric condition evaluates a distance between a point and an epipolar line projected by a corresponding matched point in the remaining image frame of the two image frames, where the epipolar geometric condition is satisfied when the epipolar distance is less than a predefined epipolar threshold distance.

The pose recovery module 46 receives the essential matrix E of the one or more cameras 22 from the essential matrix module 44 of the one or more controllers 20 and determines an alignment angle difference A of the one or more cameras 22 based on the essential matrix E of the one or more cameras 22 and the set of matched pixel pairs between the two image frames. The alignment angle difference A represents a difference in motion of the one or more cameras 22 between an image frame captured at a current timestamp and historical motion of the one or more cameras 22. The pose recovery module 46 of the one or more controllers 20 determines the motion of the one or more cameras 22 at the current timestamp by executing a camera pose recovery algorithm to recover the motion of the one or more cameras 22 between the unique timestamps of the two image frames based on the essential matrix E of the one or more cameras 22 and the set of matched pixel pairs between the two image frames. The motion of the one or more camera 22 at the current timestamp is represented by relative camera rotation and translation and includes six degrees of freedom.

The historical motion of the one or more cameras 22 is represented by historical results of pose recovery between two camera coordinate systems that each correspond to one of the two image frames collected over a period time. In embodiments, the period of time is at least about thirty seconds in duration. It is to be appreciated that the pose recovery module 46 of the one or more controllers 20 may perform various data operational such as, for example, noise removal and averaging upon the data representing the accumulated motion of the camera 22 to ensure that the historical results of pose recovery between the two camera coordinate systems that each correspond to one of the two image frames is reliable and stable.

The pose recovery module 46 evaluates the historical results of pose recovery between the two camera coordinate systems that each correspond to one of the two image frames to determine a convergence condition. Specifically, determining the convergence condition includes confirming the historical results of the pose recovery include a threshold sample size of image frames. The threshold sample size is selected to ensure the historical results of the pose recovery are reliable and stable. In one embodiment, the threshold sample size is about 1,000 image frames. In response to determining the historical results of the pose recovery include the threshold sample size, the pose recovery module 46 then evaluates the historical results of the pose recovery to confirm that a difference in motion between a most recent image frame and historical motion representing all the image frames that are part of the historical results of the pose recovery decreases in value over the period of time. Confirming that the difference in motion decreases in value over time may be determined based on either the cumulative average approach or the moving window average approach. In response to confirming the historical results of the pose recovery include the threshold sample and the difference in motion between the most recent image frame and the historical motion representing all the image frames that are part of the historical results of the pose recovery decreases in value over the period of time, the pose recovery module 46 determines the convergence condition exists.

Continuing to refer to FIG. 2, the vision filtering module 50 of the one or more controllers 20 receives the feature matching ratio $r_1$ from the feature matching evaluation module 42, the essential matrix inlier ratio $r_2$ from the essential matrix module 44, the alignment angle difference A from the pose recovery module 46, and the convergence condition from the pose recovery module 46. As explained below by the process flow diagram shown in FIG. 4, the vision filtering module 50 of the one or more controllers 20 compares the feature matching ratio $r_1$, the essential matrix inlier ratio $r_2$, and the alignment angle difference A with respective threshold values. In response to determining the feature matching ratio $r_1$, the essential matrix inlier ratio $r_2$, and the alignment angle difference A each exceed their respective threshold values, and in response to the pose recovery module 46 determining the convergence condition exists, the vision filtering module 50 of the one or more controllers 20 then determines a potential misalignment condition of the one or more cameras 22 exists, and adds the alignment angle difference A to a queue including a sequence of historical alignment angle difference values that are based on of the historical motion of the one or more cameras 22. The statistic filtering module 52 of the one or more controllers 20 then performs statistical filtering to determine a total number of historical alignment angle difference values within the queue that are inliers and determines the misalignment condition of the one or more cameras 22 based on the total number of historical alignment angle difference values within the queue that are inliers.

Figure 4:
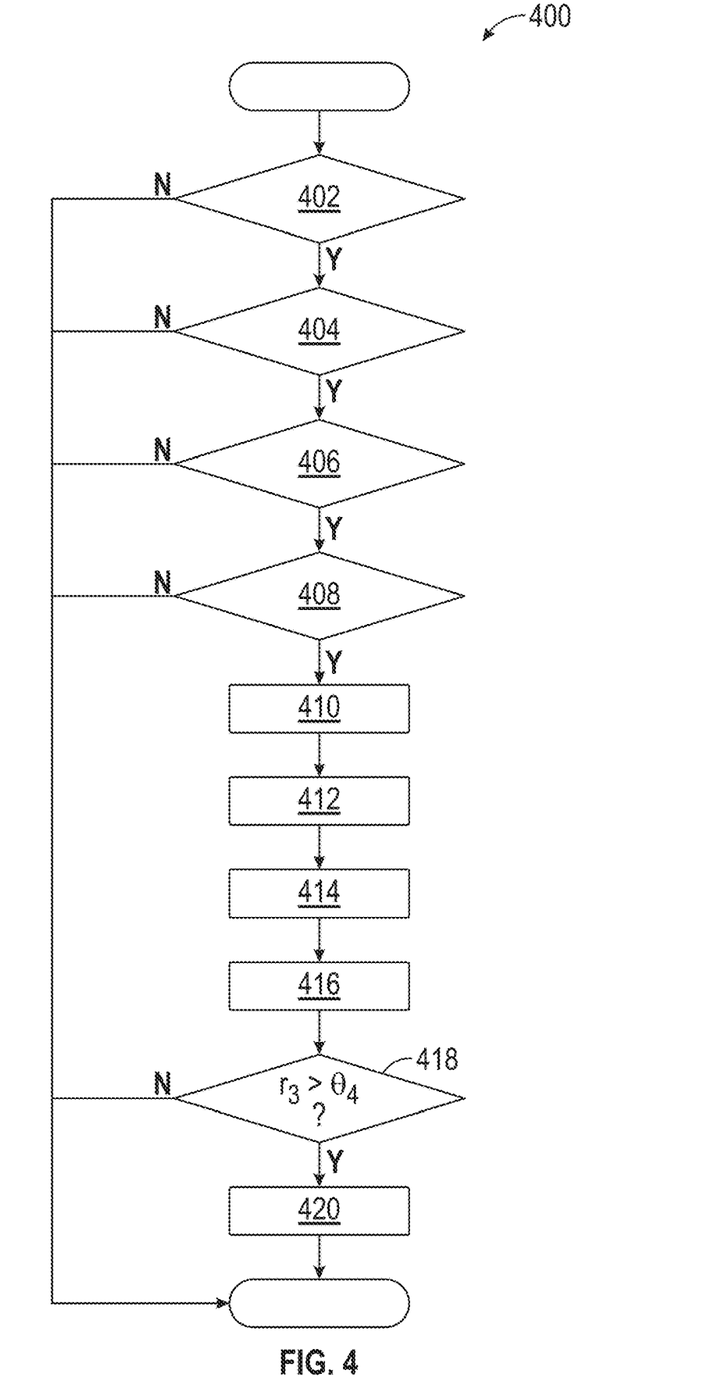
FIG. 4 is a process flow diagram illustrating a method for determining a misalignment condition of the one or more cameras of the vehicle, according to an exemplary embodiment.

FIG. 4 is a process flow diagram illustrating a method 400 for determining the misalignment condition of the one or more cameras 22 based on the feature matching ratio $r_1$, the essential matrix inlier ratio $r_2$, the alignment angle difference A, and the convergence condition. Referring generally to FIGS. 1-4, the method 400 may begin at block 402. In block 402, the vision filtering module 50 of the one or more controllers 20 compares the alignment angle difference A with an angle difference threshold. In response to determining the alignment angle difference A is less than or equal to the angle difference threshold, the method 400 terminates. The angle difference threshold is selected to indicate a camera misalignment condition and is determined based on a target accuracy of the one or more cameras 22 and varies based on the specific application.

In response to determining the alignment angle difference A is greater than the angle difference threshold, the method 400 proceeds to block 404. In block 404, the vision filtering module 50 of the one or more controllers 20 compares the essential matrix inlier ratio $r_2$ with an essential matrix inlier ratio threshold value. The essential matrix inlier ratio threshold value is selected based on a number of matched pixel pairs between the two image frames that satisfy the epipolar geometric condition. In response to determining the essential matrix inlier ratio $r_2$ is less than or equal to the essential matrix inlier ratio threshold value, the method 400 terminates.

In response to determining the essential matrix inlier ratio $r_2$ is greater than the essential matrix inlier ratio threshold value, the method 400 proceeds to block 406. In block 406, the vision filtering module 50 of the one or more controllers 20 compares the feature matching ratio $r_1$ with a threshold feature matching ratio value. The threshold feature matching ratio value is selected based on a number of matched pixel pairs between the two image frames predicted within the threshold distance value that are classified as inliers when the one or more cameras 22 are not misaligned. In response to determining the feature matching ratio $r_1$ is less than or equal to the threshold feature matching ratio value, the method 400 terminates.

In response to determining the feature matching ratio $r_1$ is greater than the threshold feature matching ratio value, the method 400 proceeds to block 408. In block 408, in response to the vision filtering module 50 receiving an indication that the convergence condition exists from the pose recovery module 46, the method 400 may then proceed to block 410. Otherwise, the method 400 terminates.

In block 410, the vision filtering module 50 of the one or more controllers 20 the vision filtering module 50 determines the potential misalignment condition of the one or more cameras 22 exists and adds the alignment angle difference A to the queue including the sequence of historical alignment angle difference values that are based on of the historical motion of the one or more cameras 22. It is to be appreciated that the queue maintains a predetermined number of the historical alignment angle difference values. The predetermined number of historical alignment angle difference values is selected to provide robust results when the statistic filtering module 52 performs the statistical filtering to determine the number of inlier alignment angle differences within the queue. The method 400 may then proceed to block 412.

In blocks 412 and 414, the statistic filtering module 52 of the one or more controllers 20 performs statistical filtering to determine the total number of historical alignment angle difference values within the queue that are inliers. In the embodiment as described, kernel density estimation (KDE) is employed to determine the inliers, however, it is to be appreciated that other statistical filtering approaches may be used as well such as, for example, a fixed distribution model based on prior knowledge, or a classifier based on supervised learning.

Referring to block 412, the statistic filtering module 52 of the one or more controllers 20 evaluates all of the historical alignment angle difference values within the queue to identify an ideal bandwidth based on a bandwidth-based loss function. The ideal bandwidth results in maximizing the bandwidth-based loss function, and also maximizes the probability of identifying a prime angle difference value when evaluating all of the historical alignment angle difference values within the queue, which is described in block 414. The bandwidth-based loss function is expressed in Equation 2 as:

$$b^* = \underset{b}{\arg\max} \sum_j \sum_i \exp\left(-\frac{(\Delta\varphi_j - \Delta\varphi_i)^2}{2b^2}\right) \quad \text{Equation 2}$$

where b* represents the ideal bandwidth, b represents the bandwidth corresponding to each of the historical alignment angle difference values within the queue, $\Delta\varphi$ represents a historical alignment angle difference value, i represents an index of one of the historical alignment angle difference values in the queue, and j represents the index of another historical alignment angle difference value other than a current historical alignment angle difference $\Delta\varphi_i$. The method 400 may then proceed to block 414.

In block 414, the statistic filtering module 52 of the one or more controllers 20 evaluates all of the historical alignment angle difference values within the queue to identify the prime alignment angle difference value based on an angle-based loss function, where the prime alignment angle difference value indicates the highest kernel density of all the historical alignment angle difference values within the queue and maximizes the angle-based loss function. The angle-based loss function is expressed in Equation 3 as:

$$\Delta\varphi^* = \underset{\Delta\varphi}{\operatorname{argmax}} \sum_i \exp\left(-\frac{(\Delta\varphi - \Delta\varphi_i)^2}{2b^{*2}}\right) \qquad \text{Equation 3}$$

where $\Delta\varphi^*$ represents the prime alignment angle difference value. The method 400 may then proceed to block 416.

In block 416, the statistic filtering module 52 of the one or more controllers 20 calculates the total number of historical alignment angle difference values that are within a predefined range of the prime alignment angle difference value, where the historical alignment difference values that fall within the predefined range of the prime alignment angle difference value are inliers. The predefined range is based on the target accuracy of the one or more cameras 22 and may vary based on the specific application. The statistic filtering module 52 of the one or more controllers 20 may then calculate an inlier ratio $r_3$ that represents the total number of historical alignment angle difference values within the queue that are inliers versus the total number of historical alignment angle difference values within the queue. The method 400 may then proceed to block 418.

In block 418, the decision module 54 of the one or more controllers 20 compares the inlier ratio $r_3$ with a threshold inlier value $\theta_3$. The threshold inlier value $\theta_3$ is selected to ensure that a sufficient number of the historical alignment angle difference values within the queue are classified as inliers, and the subsequent misalignment condition of the one or more cameras 22 is not intermittent or is only present for a few image frames due to a condition other than camera misalignment. In response to determining the inlier ratio $r_3$ is less than or equal to the threshold inlier value $\theta_3$, the decision module 54 determines the misalignment condition with the one or more cameras 22 has not occurred, and the method 400 terminates.

In response to determining the inlier ratio $r_3$ is greater than the threshold inlier value $\theta_3$, the decision module 54 determines the misalignment condition with the one or more cameras 22 has occurred, and the method 400 may proceed to block 420. In block 420, the decision module 54 of the one or more controllers 20 instructs the one or more notification devices 24 to inform a user of the vehicle 12 of a misalignment condition with the one or more cameras 22. The decision module 54 of the one or more controllers 20 also transmits the disablement signal to the one or more controllers 30 that are part of one or more systems within the vehicle 12 that rely upon image data collected by the one or more cameras 22. The method 400 may then terminate.

Referring generally to the figures, the disclosed camera misalignment detection system provides various technical effects and benefits. Specifically, the disclosed camera misalignment detection system relies upon feature matching between the two image frames, the essential matrix of the one or more cameras, the alignment angle difference of the one or more cameras, the convergence condition, and statistical filtering to determine a misalignment condition with the one or more cameras of the vehicle. It is to be appreciated that the disclosed approach for detecting misalignment results in improved accuracy and may trigger fewer false positive misalignment conditions when compared to existing camera misalignment detection systems, especially when the vehicle is experiencing limited visibility conditions such as nighttime driving and inclement weather.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A camera misalignment detection system for detecting a misalignment condition of one or more cameras for a vehicle, the camera misalignment detection system comprising:

one or more controllers in electronic communication with the one or more cameras to receive two image frames from the one or more cameras, the one or more controllers including one or more processors that execute instructions to:

determine a set of matched pixel pairs between the two image frames, wherein each matched pixel pair of the set of matched pixel pairs indicates movement of a specific pixel between the two image frames;

determine a feature matching ratio based on the set of matched pixel pairs, wherein the feature matching ratio represents a number of matched pixel pairs between the two image frames that are predicted within a threshold distance value and are classified as inliers versus a total number of matched pixel pairs between the two image frames;

calculate an alignment angle difference of the one or more cameras based on an essential matrix of the one or more cameras and the set of matched pixel pairs between the two image frames;

compare the feature matching ratio, an essential matrix inlier ratio, and the alignment angle difference with respective threshold values;

in response to determining the feature matching ratio, the essential matrix inlier ratio, and the alignment angle difference each exceed the respective threshold values, determine a potential misalignment condition of the one or more cameras exists and add the alignment angle difference to a queue including a sequence of historical alignment angle difference values;

perform statistical filtering to determine a total number of historical alignment angle difference values within the queue that are inliers; and determine the misalignment condition of the one or more cameras based on the total number of historical alignment angle difference values within the queue that are inliers.

2. The camera misalignment detection system of claim 1, wherein the one or more processors of the one or more controllers execute instructions to:

in response to determining the misalignment condition of the one or more cameras, transmit a disablement signal to one or more systems within the vehicle that rely upon image data collected by the one or more cameras.

3. The camera misalignment detection system of claim 1, wherein the alignment angle difference represents a difference in motion of the one or more cameras between an image frame captured at a current timestamp and historical motion of the one or more cameras.

4. The camera misalignment detection system of claim 3, wherein the one or more processors of the one or more controllers execute instructions to:

evaluate historical results of pose recovery between two camera coordinate systems that each correspond to one of the two image frames over a period of time to determine a convergence condition, wherein the historical motion of the one or more cameras is represented by the historical results of the pose recovery between the two camera coordinate systems, and wherein determining the potential misalignment condition of the one or more cameras is further based on the convergence condition.

5. The camera misalignment detection system of claim 4, wherein the convergence condition is determined by:

confirming the historical results of the pose recovery between the two camera coordinate systems that each correspond to one of the two image frames include a threshold sample size of image frames.

6. The camera misalignment detection system of claim 1, wherein the statistical filtering to determine the total number of historical alignment angle difference values within the queue that are inliers includes:

evaluating all of the historical alignment angle difference values within the queue to identify an ideal bandwidth based on a bandwidth-based loss function.

7. The camera misalignment detection system of claim 6, wherein the bandwidth-based loss function is expressed as:

$$b^* = \underset{b}{\operatorname{argmax}} \sum_j \sum_i \exp\left(-\frac{(\Delta\varphi_j - \Delta\varphi_i)^2}{2b^2}\right)$$

wherein b* represents the ideal bandwidth, b represents a bandwidth corresponding to each of the historical alignment angle difference values within the queue, $\Delta\varphi$ represents a historical alignment angle difference value, i represents an index of one of the historical alignment angle difference values in the queue, and j represents the index of another historical alignment angle difference value other than a current historical alignment angle difference $\Delta\varphi_i$.

8. The camera misalignment detection system of claim 6, wherein the statistical filtering to determine the total number of historical alignment angle difference values within the queue that are inliers includes:

evaluating all of the historical alignment angle difference values within the queue to identify a prime alignment angle difference value based on an angle-based loss function, wherein the prime alignment angle difference value indicates the highest kernel density of all the historical alignment angle difference values within the queue.

9. The camera misalignment detection system of claim 8, wherein the angle-based loss function is expressed as:

$$\Delta\varphi^* = \underset{\Delta\varphi}{\operatorname{argmax}} \sum_i \exp\left(-\frac{(\Delta\varphi - \Delta\varphi_i)^2}{2b^{*2}}\right)$$

wherein $\Delta\varphi^*$ represents the prime alignment angle difference value, b* represents the ideal bandwidth, $\Delta\varphi$ represents a historical alignment angle difference value, and i represents an index of one of the historical alignment angle difference values in the queue.

10. The camera misalignment detection system of claim 1, wherein the feature matching ratio is determined by:

predicting a position of the specific pixel for each matched pixel pair that is part of the set of matched pixel pairs in a subsequent image frame based on the movement of the specific pixel as indicated by the matched pixel pair between the two image frames, motion of the vehicle, camera-to-vehicle alignment parameters, and a position of a feature that the specific pixel represents in three-dimensional space in the real world.

11. The camera misalignment detection system of claim 10, wherein the position of the specific pixel in a subsequent image frame is represented by a two-dimensional probabilistic distribution.

12. The camera misalignment detection system of claim 11, wherein the feature matching ratio is determined by:

determining a distance between the two-dimensional probabilistic distribution representing the position of the specific pixel in the subsequent image frame with an actual position of the specific pixel as indicated by the subsequent image frame for each matched pixel pair that is part of the set of matched pixel pairs; and determining the feature matching ratio by comparing the distance between the two-dimensional probabilistic distribution and the actual position of the specific pixel for each matched pixel pair that is part of the set of matched pixel pairs with a threshold distance value.

13. The camera misalignment detection system of claim 12, wherein the distance between the two-dimensional probabilistic distribution and the actual position of the specific pixel as indicated by the subsequent image frame is represented by the Mahalanobis distance.

14. The camera misalignment detection system of claim 11, wherein the two-dimensional probabilistic distribution is a two-dimensional Gaussian distribution.

15. A method for detecting a misalignment condition of one or more cameras that are part of a vehicle, the method comprising:

determining, by one or more controllers in electronic communication with the one or more cameras, a set of matched pixel pairs between two image frames received by the one or more cameras, wherein each matched pixel pair of the set of matched pixel pairs indicates movement of a specific pixel between the two image frames;

determining, by the one or more controllers, a feature matching ratio based on the set of matched pixel pairs, wherein the feature matching ratio represents a number of matched pixel pairs between the two image frames that are predicted within a threshold distance value and are classified as inliers versus a total number of matched pixel pairs between the two image frames;

calculating, by the one or more controllers, an alignment angle difference of the one or more cameras based on an essential matrix of the one or more cameras and the set of matched pixel pairs between the two image frames;

comparing, by the one or more controllers, the feature matching ratio, an essential matrix inlier ratio, and the alignment angle difference with respective threshold values;

in response to determining the feature matching ratio, the essential matrix inlier ratio, and the alignment angle difference each exceed the respective threshold values, determining a potential misalignment condition of the one or more cameras exists and adding the alignment angle difference to a queue including a sequence of historical alignment angle difference values;

performing, by the one or more controllers, statistical filtering to determine a total number of historical alignment angle difference values within the queue that are inliers; and determining, by the one or more controllers, a misalignment condition of the one or more cameras based on the total number of historical alignment angle difference values within the queue that are inliers.

16. The method of claim 15, wherein the method further comprises:

in response to determining the misalignment condition of the one or more cameras, transmitting, by the one or more controllers, a disablement signal to one or more systems within the vehicle that rely upon image data collected by the one or more cameras.

17. A camera misalignment detection system for detecting a misalignment condition of one or more cameras for a vehicle, the camera misalignment detection system comprising:

one or more controllers in electronic communication with the one or more cameras to receive two image frames from the one or more cameras, the one or more controllers including one or more processors that execute instructions to:

determine a set of matched pixel pairs between the two image frames, wherein each matched pixel pair of the set of matched pixel pairs indicates movement of a specific pixel between the two image frames;

determine a feature matching ratio based on the set of matched pixel pairs, wherein the feature matching ratio represents a number of matched pixel pairs between the two image frames that are predicted within a threshold distance value and are classified as inliers versus a total number of matched pixel pairs between the two image frames;

calculate an alignment angle difference of the one or more cameras based on an essential matrix of the one or more cameras and the set of matched pixel pairs between the two image frames, wherein the alignment angle difference represents a difference in motion of the one or more cameras between an image frame captured at a current timestamp and historical motion of the one or more cameras;

evaluate historical results of pose recovery between two camera coordinate systems that each correspond to one of the two image frames over a period of time to determine a convergence condition, wherein the historical motion of the one or more cameras is represented by the historical results of the pose recovery between the two camera coordinate systems that each correspond to one of the two image frames;

compare the feature matching ratio, an essential matrix inlier ratio, and the alignment angle difference with respective threshold values;

in response to determining the feature matching ratio, the essential matrix inlier ratio, and the alignment angle difference each exceed the respective threshold values and that the convergence condition exists, determine a potential misalignment condition of the one or more cameras exists and add the alignment angle difference to a queue including a sequence of historical alignment angle difference values;

perform statistical filtering to determine a total number of historical alignment angle difference values within the queue that are inliers;

determine a misalignment condition of the one or more cameras based on the total number of historical alignment angle difference values within the queue that are inliers; and in response to determining the misalignment condition of the one or more cameras, transmit a disablement signal to one or more systems within the vehicle that rely upon image data collected by the one or more cameras.

18. The camera misalignment detection system of claim 17, wherein the statistical filtering to determine the total number of historical alignment angle difference values within the queue that are inliers includes:

evaluating all of the historical alignment angle difference values within the queue to identify an ideal bandwidth based on a bandwidth-based loss function.

19. The camera misalignment detection system of claim 18, wherein the statistical filtering to determine the total number of historical alignment angle difference values within the queue that are inliers includes:

evaluating all of the historical alignment angle difference values within the queue to identify a prime alignment angle difference value based on an angle-based loss function, wherein the prime alignment angle difference value indicates the highest kernel density of all the historical alignment angle difference values within the queue.

20. The camera misalignment detection system of claim 17, wherein the feature matching ratio is determined by:

predicting a position of the specific pixel for each matched pixel pair that is part of the set of matched pixel pairs in a subsequent image frame based on the movement of the specific pixel as indicated by the matched pixel pair between the two image frames, motion of the vehicle, camera-to-vehicle alignment parameters, and a position of a feature that the specific pixel represents in three-dimensional space in the real world.

* * * * *